(12) United States Patent
Liu et al.

(10) Patent No.: US 8,246,714 B2
(45) Date of Patent: Aug. 21, 2012

(54) PRODUCTION OF METAL AND METAL-ALLOY NANOPARTICLES WITH HIGH REPETITION RATE ULTRAFAST PULSED LASER ABLATION IN LIQUIDS

(75) Inventors: Bing Liu, Ann Arbor, MI (US); Zhendong Hu, Ann Arbor, MI (US); Makoto Murakami, Ann Arbor, MI (US); Yong Che, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 596 days.

(21) Appl. No.: 12/320,617

(22) Filed: Jan. 30, 2009

(65) Prior Publication Data

US 2010/0196192 A1 Aug. 5, 2010

(51) Int. Cl.
*B22F 9/02* (2006.01)
*B22F 9/04* (2006.01)

(52) U.S. Cl. .................. 75/345; 204/157.15; 204/157.4; 204/157.41

(58) Field of Classification Search ................. 75/345; 204/157.15, 157.4, 157.41; 219/121.6; 241/1
See application file for complete search history.

(56) References Cited

U.S. PATENT DOCUMENTS

| | | | |
|---|---|---|---|
| 4,059,759 A | 11/1977 | Harney | |
| 4,306,771 A | 12/1981 | Bjorklund | |
| 5,539,764 A | 7/1996 | Shields | |
| 5,660,746 A | 8/1997 | Witanachchi | |
| 5,720,894 A | 2/1998 | Neev | |
| 5,742,634 A | 4/1998 | Rieger | |
| 5,756,924 A | 5/1998 | Early | |
| 5,790,574 A | 8/1998 | Rieger | |
| 6,060,128 A | 5/2000 | Kim et al. | |
| 6,156,030 A | 12/2000 | Neev | |
| 6,312,768 B1 | 11/2001 | Rode | |
| 6,324,195 B1 | 11/2001 | Suzuki | |

(Continued)

FOREIGN PATENT DOCUMENTS

WO   WO 9913127 A1   3/1999

(Continued)

OTHER PUBLICATIONS

A.V. Simakin et al., Nanodisks of Au and Ag produced by laser ablation in liquid environment, Chemical Physics Letters, vol. 348, (2001), pp. 182-186.*

(Continued)

*Primary Examiner* — George Wyszomierski
*Assistant Examiner* — Mark L Shevin
(74) *Attorney, Agent, or Firm* — Sughrue Mion, PLLC

(57) ABSTRACT

Various embodiments include a method of producing chemically pure and stably dispersed metal and metal-alloy nanoparticle colloids with ultrafast pulsed laser ablation. A method comprises irradiating a metal or metal alloy target submerged in a liquid with ultrashort laser pulses at a high repetition rate, cooling a portion of the liquid that includes an irradiated region, and collecting nanoparticles produced with the laser irradiation and liquid cooling. The method may be implemented with a high repetition rate ultrafast pulsed laser source, an optical system for focusing and moving the pulsed laser beams, a metal or metal alloy target submerged in a liquid, and a liquid circulating system to cool the laser focal volume and collect the nanoparticle products. By controlling various laser parameters, and with optional liquid flow movement, the method provides stable colloids of dispersed metal and metal-alloy nanoparticles. In various embodiments additional stabilizing chemical agents are not required.

23 Claims, 7 Drawing Sheets

U.S. PATENT DOCUMENTS

| | | | |
|---|---|---|---|
| 6,574,250 | B2 | 6/2003 | Sun |
| 6,664,498 | B2 | 12/2003 | Forsman |
| 6,727,458 | B2 | 4/2004 | Smart |
| 6,783,569 | B2 | 8/2004 | Cheon et al. |
| 7,113,327 | B2 | 9/2006 | Gu |
| 7,330,301 | B2 | 2/2008 | Harter |
| 2001/0009250 | A1 | 7/2001 | Herman |
| 2002/0167581 | A1 | 11/2002 | Cordingley |
| 2003/0151033 | A1 | 8/2003 | Shepherd et al. |
| 2004/0134896 | A1 | 7/2004 | Gu |
| 2005/0041976 | A1 | 2/2005 | Sun |
| 2005/0167405 | A1 | 8/2005 | Stoltz |
| 2005/0226287 | A1* | 10/2005 | Shah et al. ............ 372/25 |
| 2005/0243396 | A1* | 11/2005 | Fujii et al. ............ 359/224 |
| 2005/0276931 | A1 | 12/2005 | Che |
| 2006/0086834 | A1 | 4/2006 | Pfeffer et al. |
| 2007/0029185 | A1* | 2/2007 | Tung ............ 204/157.41 |
| 2007/0051202 | A1 | 3/2007 | Raghuraman et al. |
| 2008/0006524 | A1 | 1/2008 | Liu |
| 2008/0041532 | A1 | 2/2008 | Chou et al. |
| 2009/0246413 | A1 | 10/2009 | Murakami |
| 2011/0192714 | A1 | 8/2011 | Liu |

FOREIGN PATENT DOCUMENTS

| | | | |
|---|---|---|---|
| WO | 2006030605 | A1 | 6/2006 |

OTHER PUBLICATIONS

S. Barcikowski et al. Generation of nanoparticle colloids by picosecond and femtosecond laser ablations in liquid flow, Applied Physics Letters, vol. 91, (2007), 083113.*

W.T. Nichols et al., Laser ablation of a platinum target in water. I. Ablation mechanisms, Journal of Applied Physics, vol. 100 (2006), 114911, 6 pages total.*

I. Lee et al., Production of Au-Ag alloy nanoparticles by laser ablation of bulk alloys, Chemical Communications, (2001), pp. 1782-1783.*

A. Pyatenko et al. Synthesis of silver nanoparticles by laser ablation in pure water, Applied Physics A, vol. 79, (2004), pp. 803-806.*

J. Brannon et al. Laser Processing for Microengineering Applications, Chapter 5 in Microengineering Aerospace Systems, editor: H. Helvajian, Copyright 1999, pp. 145, 160-162, 187, and 188.*

S. Barcikowski et al., "Properties of nanoparticles generated during femtosecond laser machining in air and water", Applied Physics A, vol. 87, 47, 2007.

S. Besner et al., "Two-step femtosecond laser ablation-based method for the synthesis of stable and ultra-pure gold nanoparticles in water", Applied Physics A, vol. 88, 269, 2007.

M. Brust et al., "Synthesis of thiol-derivatized gold nanoparticles in a 2-phase liquid-liquid system", Journal of the Chemical Society, Chemical Communications, Issue 7, 801, 1994.

T. E. Itina et al., "Mechanisms of nanoparticle formation by short laser pulses", Proceedings of SPIE, vol. 6458, 64581U-1, (2007).

B. Liu et al., "Ultrafast sources: ultrafast lasers produce nanoparticles", Laser Focus World, vol. 43, Is 9, p. 74 (2007).

F. Mafuné et al., "Formation of gold nanoparticles by laser ablation in aqueous solution of surfactant".J. Physical Chem B, 105, 5114-5120 May 2001.

J. Turkevich et al., "A study of the nucleation and growth processes in the synthesis of colloidal gold", Discussions of the Faraday Society, Issue 11, 55, 1951.

D. Yang et al, "Fabrication of gold nanoparticles by pulsed laser ablation in aqueous media", Journal of Laser Micro/Nanoengineering, vol. 3, 147, 2008.

U.S. Appl. No. 12/254,076, Murakami.

A. Reilly et al., "Pulsed laser deposition with a high average power free electron laser: Benefits of subpicosecond pulses with high repletion rate", Journal of Applied Physics, vol. 93, 3098, 2003.

B. Liu et al., "Nanoparticle generation in ultrafast pulsed laser ablation of nickel", Applied Physics Letters, vol. 90, 044103 (2007).

B. Luther-Davies et al., "Picosecond high repetition rate pulsed laser ablation of dielectric: the effect of energy accumulation between pulses", Optical Engineering, vol. 44, 055102, 2005.

Bulgakova et al., "Pulsed laser ablation of solids transition from normal vaporization to phase explosion", APA, vol. 73, pp. 1990208, 2001.

D. F. Hueesy at al., "Water, Ultrapure" in Ullmann's Ency. Of Industrial Chemistry, Pub. Oct. 15th, 2008, 26 pgs.

E. G. Gamaly et al., "Ultrafast ablation with high pulse rate lasers, Part I: Theoretical considerations", Journal of Applied Physics, vol. 85, 4213, 1999.

E. G. Gamaly et al., "Ultrafast ablation with high pulse rate lasers, Part II: Experiments on laser deposition of amorphous carbon films", Journal of Applied Physics, vol. 85, 4222, 1999.

Facile and rapid synthesis of highly luminescent nanoparticles via pulsed laser ablation in liquid, G. Ledoux et al.: Nanotechnology 20, (2009) 445605 8 pp.

J. Bovatsek et al., "Laser Ablation Threshold and Etch Rate Comparison between the Ultrafast Yb fiber-based FCPA Laser and a Ti:Sapphire Laser for Various Materials," Proceedings of SPIE, vol. 5662, pp. 661-666, 2004.

J. H. Yin et al, "High coercivity in nanostructured Co-ferrite thin films", Bulletin of Material Science vol. 29, No. 6, Nov. 2006 pp. 573-580.

M. Murakami et al., "Burst-Mode Femtosecond Pulsed Laser Deposition for Control of Thin Film Morphology and Material Ablation", Applied Physics Express 2 (2009) 042501.

Mafuné et al., "Formation of stable Pt NPs by laser ablation in water", J Physical Chemistry B, vol. 107, pp. 4218-4223, 2003.

Nature Photonics Research Highlights, "Burst-mode benefits" technology review of M. Murakami et al., "Burst-Mode Femtosecond Pulsed Laser Deposition for Control of Thin Film Morphology and Material Ablation", Applied Physics Express 2 (2009) 042501. This review is found in Nature Photonics, vol. 3, May 2009, p. 261.

S. Eliezer et al., "Synthesis of nanoparticles with femtosecond laser pulses", Physical Review B, vol. 69, 144119, 2004.

T. Donnelly et al., "Double pulse ultrafast laser ablation of Nickel in vacuum", Journal of Applied Physics 106, 013304, 2009.

Yang, Li, Chapter 2, "Liquid-Phase Pulsed Laser Ablation" in Self-assemble and Ordering Nanomaterials by Liquid-Phased Pulsed Laser Ablation, Dissertation, Nov. 2007 pp. 33-51.

* cited by examiner

PRODUCTION OF METAL AND METAL-ALLOY NANOPARTICLES WITH HIGH REPETITION RATE ULTRAFAST PULSED LASER ABLATION IN LIQUIDS

CROSS REFERENCE TO RELATED APPLICATIONS

This application is related to U.S. Ser. No. 11/712,924, entitled "Method for producing and depositing nanoparticles", filed Mar. 2, 2007, now published as U.S. Patent Application Publication Pub. No. 2008/000652. U.S. Ser. No. 11/712,924 is hereby incorporated by reference in its entirety. This application is also related to U.S. Ser. No. 12/254,076, entitled "A method for fabricating thin films", filed Oct. 20, 2008. U.S. Ser. No. 12/254,076 is hereby incorporated by reference in its entirety.

FIELD OF THE INVENTION

This invention relates to pulsed laser ablation and nanoparticle generation.

BACKGROUND

Portions of the following specification make reference to various patent documents and non-patent literature. The citations are listed as Patent documents and non-patent literature near the conclusion of the section entitled "Detailed Description".

There are mainly two categories of methods of producing metal nanoparticles: chemical and physical methods. All chemical methods involve complex chemical agents for reducing the source compounds and stabilizing the colloid against coagulation. Taking gold nanoparticle as an example: one of the traditional chemical methods [Ref. 1] uses a reducing agent of sodium citrate to reduce chloroauric acid in a liquid such as water. The sodium ions also act as surfactant and prevent the gold nanoparticles from aggregation. In another traditional chemical process [Ref. 2], sodium borohydride is used as the reducing agent and tetraoctylammonium bromide is used as the stabilizing agent. Apparently a nanoparticle colloid made with these methods will contain many chemical ingredients in addition to the metal and the liquid. For many applications, these additional chemical ingredients can negatively affect the performance. For example, in biomedical and sensing applications, the stabilizing surfactants that are added during the production process can reduce the ability of gold nanoparticles to bind with those molecules that functionalize the nanoparticles for the intended application. Also, in catalyst applications, the catalytic activities of nanoparticles can be reduced by the chemical stabilizers, which reduce the effective surface area of nanoparticles exposed to the reactions.

One of the physical methods to produce metal nanoparticles is pulsed laser ablation in liquids [Ref. 3-6]. In this process, a pulsed laser beam is focused on the surface of a target that is submerged in a liquid. The ablated material re-nucleates in the liquid and form nanoparticles. This is a practically very simple and economic method. However, for the same reason of preventing nanoparticle aggregation, stabilizing chemical agents need to be added in the liquid during the ablation process [Ref. 6].

Many attempts have been tried to obtain chemically pure (i.e., free of chemical agents such as polymer, surfactant, ligand, and etc. for stabilization) metal nanoparticle colloids. For example, in a two-step femtosecond laser ablation method [Ref. 5], a Ti:sapphire laser is first used to ablate a gold target in water to produce a colloid. The colloid is then irradiated by the same laser for an elongated time up to 2 hrs. It is believed that the white light super-continuum induced by the intense ultrashort laser pulse in water can fragment large particles into nanoparticles and prevent coagulation.

For applications in photonics, another issue is to obtain tunable plasmon resonant frequency, primarily with gold nanoparticles. One suggested way is to vary the gold nanoparticle sizes, but the amount of shift of the resonant frequency is limited. An alternative way is to form alloy nanoparticles. It is expected that by adjusting the alloy composition, other physical properties such as plasmon resonance wavelength can be tuned accordingly. Again, the issue of preventing particle aggregation needs to be addressed in both chemical and physical methods of making alloy nanoparticles.

For laser-ablation based physical methods, certain production rates may be required. Laser power and pulse repetition rate are factors that limit production speed. The repetition rate can be particularly relevant because the amount of material removed by each laser shot is limited by the target material's absorption length at the laser wavelength. Standard solid state pulsed lasers such as Nd:YAG and Ti:Sapphire have very high pulse energy, ranging from milli-Joule to Joule, but a limited pulse repetition rate, ranging from 10 Hz to 1 kHz. In the two-step femtosecond laser ablation method introduced in [Ref. 8], the long irradiation time in the second step further limits the production rate.

As used herein, a stable colloid refers to a colloid having nanoparticles that do not aggregate during an extended time period after production. Such an extended time period may be at least one week, and more preferably longer than one month. By way of example, a red color of a gold colloid will be preserved for at least one month, and the colloid may be characterized with optical absorption spectroscopy measurements.

As used herein, a chemically pure colloid refers to a colloid that contains only a liquid and nanoparticles. Such a chemically pure colloid does not require an additional chemical agent to prevent aggregation among nanoparticles, and does not require such a chemical to stabilize the colloid against coagulation. By way of example, a chemically pure gold-water colloid contains only water and gold nanoparticles, and is substantially free of stabilizing agents, such as a polymer, surfactant, ligand, or similar agents.

SUMMARY OF THE INVENTION

A desirable advancement for production of metal or metal-alloy nanoparticles avoids coagulation, eliminates a requirement for any stabilizing agent, and provides for rapid throughput.

Several problems with the production of metal and metal-alloy nanoparticles are solved with various embodiments. The problems include but are not limited to colloid stability, colloid purity, variable plasmon resonance, and production rate.

At least one embodiment provides a physical method of producing nanoparticles, for example metal or metal-alloy nanoparticles, with ultrashort pulsed laser ablation in liquids.

At least one embodiment includes a method of producing nanoparticle colloids. The method includes generating pulsed laser beams at a repetition rate. The pulsed laser beams irradiate a target disposed in liquid that is substantially transparent at a wavelength of the pulsed laser beams. The target comprises a source material for production of metal or metal-alloy nanoparticles. The method includes producing liquid flow, relative motion between the pulsed laser beams and the target, or both.

At least one embodiment includes a system for carrying out the above method.

At least one embodiment provides a product comprising a colloid that does not coagulate during an extended time period, for example at least one week. The colloid does not contain stabilizing chemical agents.

At least one embodiment provides a product comprising metal or metal alloy nanoparticles collected from colloids. The colloids do not coagulate during an extended time period, for example at least one week. The colloid does not contain stabilizing chemical agents.

In various embodiments:
- a repetition rate is in the range of about 10 kHz to 100 MHz, and more preferably in the range of about 100 KHz to 10 MHz.
- a pulse duration is in the range of about 10 femtoseconds to 200 picoseconds, and preferably between about 0.1-10 ps.
- a pulse energy is in the range of about 100 nano-Joule to 1 milli-Joule, and preferably between about 1-10 micro-Joule.
- a target comprises gold, silver, or copper.
- a target comprises binary and ternary alloys of gold, silver, and copper.
- a target comprises a precious metal,
- the precious metal may comprise platinum, palladium, or alloys containing platinum or palladium.
- a liquid comprises de-ionized water.
- de-ionized water may have a resistance greater than 0.05 M Ohm.cm.
- liquid flow includes liquid movement across the target surface.
- liquid flow speed may be greater than 10 ml/s.
- liquid flow may be produced by a vibration stage.
- a vibration stage may cause movement with a frequency greater than about 1 Hz, and an amplitude greater than about 1 mm.
- relative motion of a pulsed laser beam may be guided by a vibration mirror.
- a vibration mirror may operate at a frequency greater than about 10 Hz, and provide an angular amplitude greater than about 0.1 mrad.
- a vibration mirror may guide laser beam movement on a target such that the focal spot moves with speed preferably greater than about 0.1 m/s.
- nanoparticle colloids do not coagulate during a time period of at least one week after production of the nanoparticles, and do not contain a stabilizing chemical agent.
- a repetition rate may be at least a few KHz, and sufficiently high such that production rates are improved relative to that obtainable with a single solid-state pulsed laser source.
- pulsed laser beams propagate within the liquid, and irradiating includes focusing the pulsed beams on a surface of the target.
- producing the relative motion includes rastering pulsed laser beams relative to the target.
- liquid flow causes cooling a region about the target and transporting of the nanoparticles away from a target region and toward a collection location.
- at least two pulsed beams may have a temporal separation of about 10 μsec or less.
- a colloid is stable for at least one week.
- a colloid is stable for at least about 2 months.
- colloids may be characterized by absorption spectra information.
- colloids may consist of liquid and nanoparticles, and the nanoparticles may comprise at least one of a metal and metal alloy.

DETAILED DESCRIPTION

Figure 1:
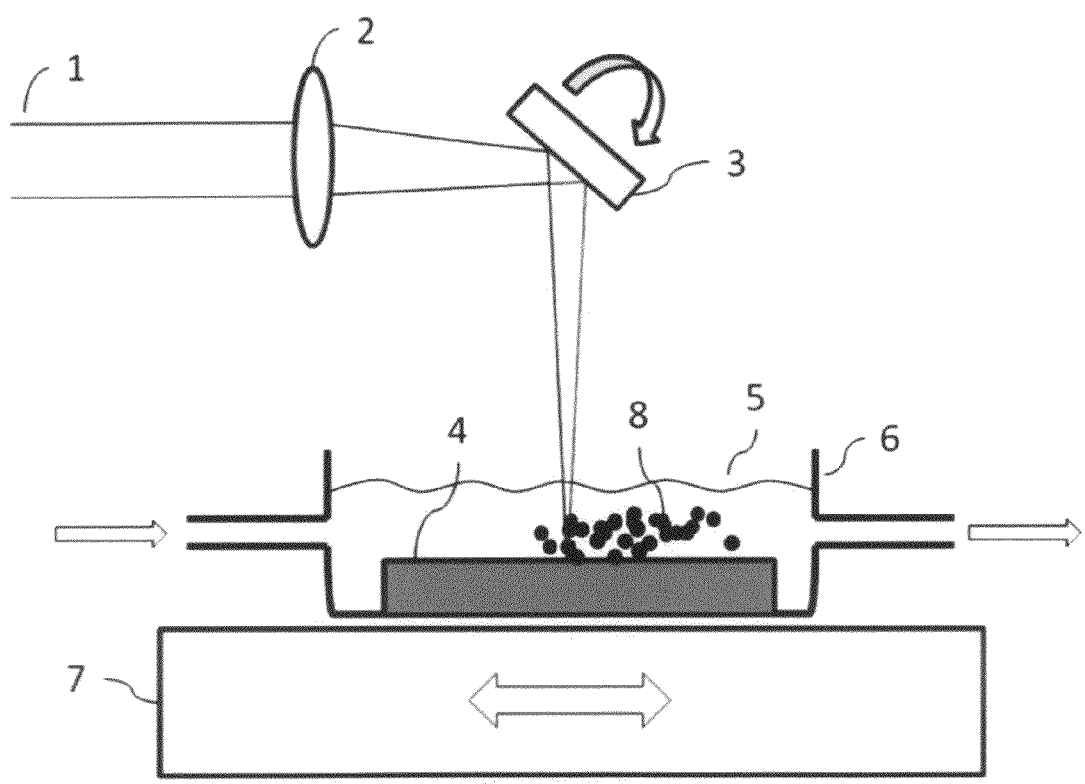
FIG. 1 schematically illustrates a laser-based system for producing nanoparticles in a liquid.

FIG. 1 schematically illustrates a portion of laser-based system for producing nanoparticles in a liquid. In an embodiment laser beam 1 is received from a ultrashort pulse source (not shown), focused by lens 2, and guided by a mechanism for rapid movement of a beam, for example a vibration mirror 3, to a target 4. The target is submerged several millimeters below the surface of a liquid 5 that is contained in a container 6, and is preferably submerged less than 1 cm. The container 6 is placed on a motion stage 7, for example a translation stage. Liquid flow is introduced through the container so that the nanoparticles 8 can be carried away and collected elsewhere. The flow of liquid also cools the laser focal volume. The liquid is preferably de-ionized water having resistivity preferably greater than 1 M ohm.cm. In some embodiments the liquid may be distilled water, or another suitable liquid. A controller (not shown) is operatively coupled to the pulsed source, motion system, and/or circulation system. The controller coordinates beam delivery, liquid flow, and motion. The controller may also be coupled to a system computer, user interface, telecommunication equipment, and/or other standard devices, and configured so as to be programmed from a remote location.

A laser for nanoparticle generation may have a wavelength of about 1.03 um (a layer of water of a few millimeters has negligible absorption at this wavelength), a pulse energy in the range of about 1 to 20 micro-Joule, and preferably below about 10 micro-Joule. A pulse duration of about 500 fs, and up to about 10 ps, may be used without significantly affecting the formation of nanoparticles. A pulse repetition rate may be in the range of about 100 kHz to 5 MHz. A preferred laser system will be further discussed below. Water flow, beam movement, or both may be used to avoid heat accumulation at the high repetition rate.

By way of example, a vibration mirror 3 is configured for fast rastering or other movement of the laser beam on the target surface. In some embodiments the mirror vibration frequency is preferably larger than 10 Hz with angular amplitude preferably larger than 1 mrad. Rastering speed on the target surface greater than 0.01 m/s may be provided. Such a mirror can be a piezo-driven mirror, a galvanometer mirror, or other suitable apparatus for beam movement.

Water flow can be introduced to the container by a circulation system, with flow speed preferably greater than 10 ml/s. When a circulation system is not available, introducing lateral vibration movement can also cause water flow locally across the ablation spot. For example motion stage 7 may be moved in a direction perpendicular to the laser beam as indicated in FIG. 1. The vibration stage preferably has a vibration frequency of several Hz and amplitude of several millimeters.

In various embodiments, stable and chemically pure colloids are produced by controlling both the laser parameters and the liquid flow. Laser parameters include pulse duration, pulse energy, pulse repetition rate, and beam movement.

Ultrashort pulse widths are preferred. In many laser processing applications an ultrashort pulse duration, for example in the range of a few picoseconds to several hundreds of femtoseconds, enhances ablation efficiency as a result of very high peak power and a small heat-affected zone.

For applications in nanoparticle generation, in particular, in a few previous studies co-authored by the inventors [Ref. 7, 8] it was found that low pulse energy (more precisely a low fluence) near the ablation threshold is preferred for nanoparticle generation. The ablated material exists predominantly in the form of nanoparticles with a narrow size distribution. A U.S. patent application No. 2008/0006524 also teaches a method of generating nanoparticles in vacuum and ambient gas based on these studies.

Preferably a high pulse repetition rate, for example at least about 10 kHz, and more preferably at least about 100 KHz, is employed, for at least three reasons. The first is the multiple pulse effect in high repetition rate pulsed laser ablation. With a pulse separation of less than 10 micro-seconds (i.e., a high repetition rate greater than 100 kHz), the ablated material, before drifting away from the laser focal volume, will receive multiple laser shots and become highly charged. The inventors discovered stable nanoparticle colloids can be made at such high repetition rates without adding additional stabilizing chemical agents. The second reason is that upon ablation by multiple pulses, fragmentation of large particles can happen, resulting in a size distribution dominated by nanoparticles. The third reason is a high production rate that benefits from a high repetition rate.

The inventors also discovered fast rastering of the laser beam during ablation is beneficial with high repetition rate operation. For example, without such fast rastering of the laser beam, the stream of nanoparticles produced by the leading laser pulses will eventually block the subsequent laser pulses by scattering and absorption. More importantly, accumulated heating of the water due to the high repetition rate can also induce nanoparticle coagulation.

In addition to the laser parameters, the inventors found that liquid motion is also useful in making stable nanoparticles. A dispersed suspension of nanoparticles in water is essentially in a metastable state, i.e., a kinetically stable state instead of a thermodynamically stable state. Flowing the liquid during production helps to reduce nanoparticle thermal movement that may overcome the kinetic barrier of coagulation. Moreover, fast rastering of the laser beam is also beneficial for reducing nanoparticle thermal motion.

Some embodiments provide nanoparticles with various plasmon resonance wavelengths. This can be achieved by using metal alloy targets. Earlier studies [Ref. 8] showed that for binary alloys such as NiFe, low fluence ablation near the ablation threshold generates nanoparticles that have the same alloy composition as the original alloy target. Based on these studies, various embodiments employ binary alloy targets and provide a method of making alloy nanoparticles with various compositions and accordingly various plasmon resonance frequencies.

Figure 2:
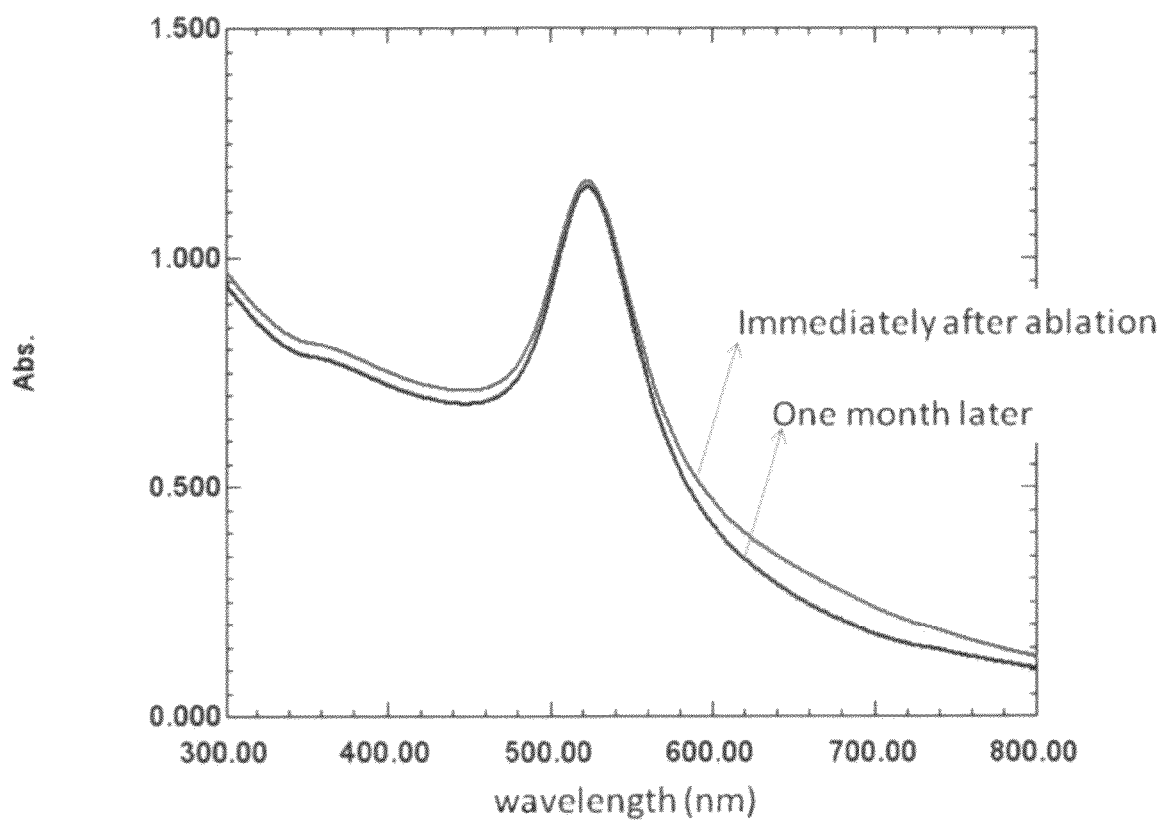
FIG. 2 is a plot of absorption versus wavelength (absorption spectra) of a gold nanoparticle water colloid measured over a one month separation. The two curves are almost identical near the resonance peak, demonstrating the high stability of the colloid.

In examples that follow, group IB elements Au, Ag, Cu and their alloys are used as demonstration examples. However, the examples are non-limiting and other metals and metal-alloys may be utilized in various embodiments. For example, precious metals may be utilized. Such metals include, but are not limited to, platinum, palladium, and alloys containing platinum or palladium. Suitable metal or metal-alloy targets are modified with ultrashort pulses. Most preferably, the target material is non-reactive with the liquid, and not oxidized by water or other liquid during laser processing. Those of skill in the art will recognize that the ablation threshold and other laser parameters for ablating other metals will vary to a degree from those of Au as discussed herein; colloids of these metals, or metal-alloys thereof, are within the scope of the present invention FIG. 2 shows two absorption spectra of a gold nanoparticle colloid made with high repetition rate, ultrashort laser ablation as disclosed above, and measured after one month to determine stability. The two spectra are nearly identical near the resonance peak, demonstrating the high stability of the colloid. In fact, the inventors also produced gold nanoparticle colloids that were stable for an extended time period of about eight months without coagulation.

Although it is not necessary to the practice of embodiments to understand the operative mechanism therein, the stability of the gold nanoparticle colloid against coagulation was investigated. A simple test was performed by intentionally adding a few drops of 1 M NaCl water solution to a gold nanoparticle water colloid. The originally red gold nanoparticle colloid became instantaneously dark purple upon the NaCl solution being added. In less than an hour the dark color disappeared and the gold colloid became colorless transparent with visible sediments sunk on the container bottom. This simple test suggested that the gold nanoparticles were charged, and the added Na+ and Cl− ions shielded the Coulomb repulsion and caused the nanoparticle aggregation.

Figure 3A:
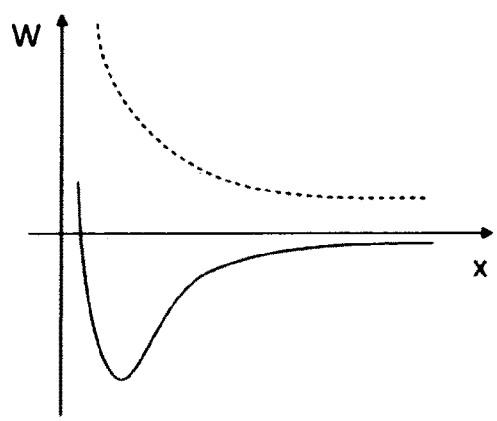
FIG. 3 is a plot schematically illustrating interaction potentials between two small particles in a liquid. 3(a): Solid curve illustrates an attractive potential between particles. Dashed curve indicates a possible repulsive potential, for example due to Coulomb repulsion. 3(b): Sum of an attractive and a repulsive potential makes a repulsive potential barrier at a certain distance ($x_o$) that can increase the distance of closest approach between two particles.
Figure 3B:
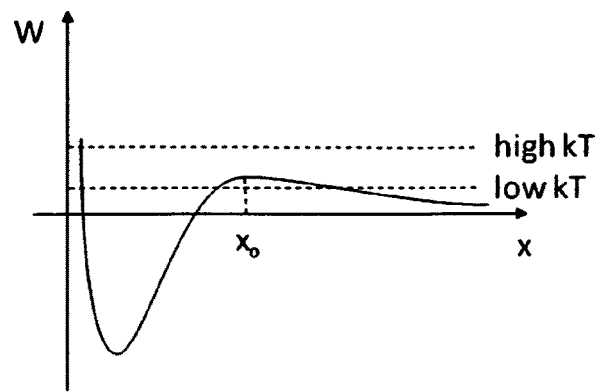

FIG. 3 schematically illustrates two cases of an interaction potential W as a function of distance x between two small particles in a liquid. The solid curve in FIG. 3(a) illustrates an attractive potential, which in the case of gold particles in water, can be due to (i) the attractive Van de Waals force between gold nanoparticles and (ii) the hydrophobic interaction between gold surface and water, which prefers particle aggregation in order to reduce interfacial energy. If the particles are charged, a Coulomb repulsion, illustrated by the dashed curve, exists between the particles. The sum of the two opposite potentials is illustrated in FIG. 3(b), where the positive (i.e., repulsive) barrier near a certain distance $x_o$ will serve to prevent particle aggregation.

Nanoparticle charge may result from a multiple pulse effect in a high repetition rate pulsed laser ablation. In general, each single laser shot, when sufficiently intense will produce a mixture of ions, electrons, neutrals, and particles, often referred to as "plume". Such a mixture may be produced when the laser intensity is above the ablation threshold. However for plume produced by a single laser shot, the charge mostly resides in the vapor part, while the solid portion, specifically the nanoparticles, remains mostly neutral. When employing a high repetition rate laser with pulse separation less than 10 micro-seconds, the solid portion, specifically the nanoparticles of the plume will receive multiple laser shots before drifting away from the focal volume. It is during this time that the particles are charged by the intense laser field.

In such a colloid the particles stay metastably dispersed against coagulation. As indicated in FIG. 3(b), when particles acquire sufficient thermal energy, corresponding with kT being greater than the barrier height, the particles will fall into the attractive trap and aggregate. This mechanism is indicated in FIG. 3(b) by the upper dashed horizontal line, and can partly explain why metal nanoparticles generated with pulsed laser ablation in water tend to aggregate when using a long pulse duration and a high pulse energy. For example, water breakdown threshold is about $1 \times 10^{13}$ W/cm$^2$, and corresponds to a fluence of about $10^4$ J/cm$^2$ for a 1 ns pulse. Even with the fluence below the water breakdown threshold, the water under illumination of such a long laser pulse can be heated to a high temperature, easily above its boiling point. The heating is manifested with bubbles which can be observed visually during ablation. The nanoparticles can therefore acquire sufficient thermal energy such that the repulsive barrier is overcome. The nanoparticles fall into the attractive trap and aggregate. For the same reason, with a high repetition rate laser, for example 10 kHz and above, fast rastering the laser beam can reduce heat accumulation in water. Water flow can also help to bring in fresh and cold water to the focal volume of the laser.

In some embodiments ablation is carried out with relatively low fluence. A fluence about 10 J/cm$^2$ with a 1 ps pulse may be excessive. For example, such an excessive fluence may be several times greater than the ablation threshold (e.g.: about 1 J/cm$^2$ with a 1 ps pulse for most metals). With excessive fluence, the ablated material is mostly evaporated, and the vapor is subsequently forced to re-nucleate under the hydrostatic pressure of the liquid. In other words, the path of phase evolution is from solid bulk, to vapor, and then to solid particles. As a result, a clogged network of nanoparticles will form upon nucleation, which degrades the stability against coagulation.

In a few earlier works of ultrashort pulsed laser ablation in vacuum and low pressure ambient gas [Ref. 7], it was found that at low laser fluence near the ablation threshold, typically less than about 3 J/cm$^2$ for most metals, the ablated material automatically exists as an ensemble of nanoparticles without forced nucleation by externally applied high pressure. This observation is later explained based on critical point phase explosion [Ref. 9], where a solid bulk disintegrates into nanoparticles near the material's critical point. This mechanism can partly account for the preferred low fluence for applications in nanoparticle generation in that the phase evolution path is from solid bulk to solid nanoparticles.

By way of example, in various embodiments for making metal or metal-alloy nanoparticles, a pulse intensity may be in the range of about $10^{11}$ to $10^{13}$ W/cm$^2$, preferably about $10^{12}$-low $10^{13}$ W/cm$^2$, and most preferably around $0.5 \times 10^{12}$-$3 \times 10^{12}$ W/cm$^2$. Moreover, with the above fluence values, raster operation with a speed from 0.01-1 m/s at the surface and liquid flow of at least about 10 ml/sec is suitable. By way of example, a minimum fluence with 1 ps pulses may be about 0.1 J/cm$^2$.

Figure 4:
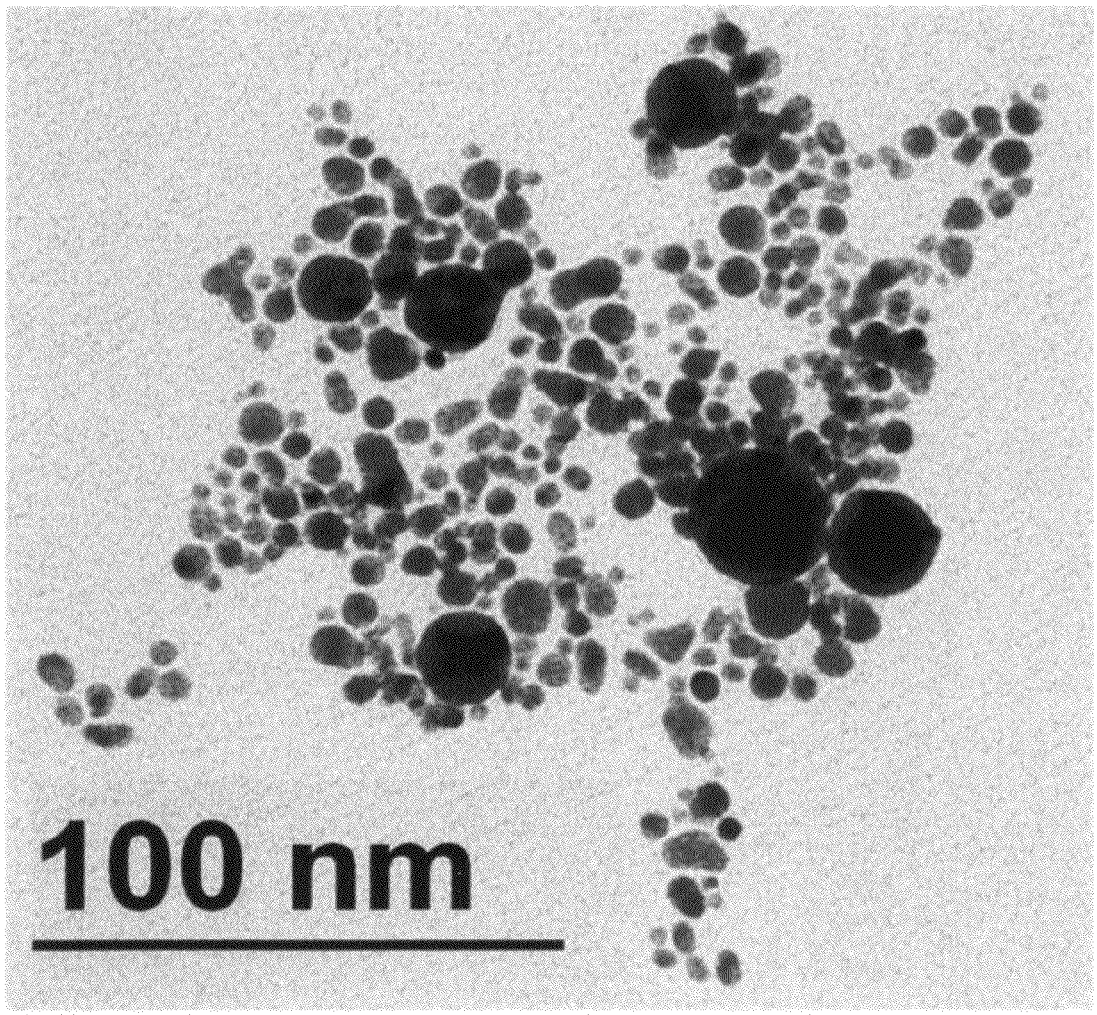
FIG. 4 is a transmission electron microscope (TEM) image of gold nanoparticles sampled by drying a drop of colloid on a TEM sampling grid.

FIG. 4 is a transmission electron microscope (TEM) image of a gold nanoparticle colloid. The sample is obtained by drying a drop of colloid on a TEM sampling grid. It is observed that the population is dominated by nanoparticles of 4-5 nm, and there are distinguishingly larger nanoparticles with diameters around 30-50 nm. This bimodal particle size distribution is consistent with what was observed on nanoparticles generated with ultrashort pulsed laser ablation of other materials such as Ni in vacuum [Ref. 7]. The particle size distribution can be improved by employing a flat transverse beam profile instead of a Gaussian beam profile, for example. Nevertheless, for many applications, the bimodal size distribution does affect performance.

To compensate for the low production rate due to the low fluence, a high repetition rate laser is also preferred. This is yet another reason for use of a high repetition rate source, for example a source that produces at least two pulses with time separation of about 0.1 µsec or less.

IMRA America Inc., the assignee of the present application, disclosed several fiber-based chirped pulse amplification systems. For example, such systems provide a high repetition rate from 100 kHz to above 1 MHz, an ultrashort pulse duration from 500 femtoseconds to a few picoseconds, and a average power of more than 10 W. By way of example, a fiber-based chirped pulse amplification system (FCPA) may be used in various embodiments. The commercially available D-1000 available from IMRA America provides microjoule pulses and an adjustable repetition rate over the range of 100 KHz to 5 MHz, with 1 W average power. Output pulse widths are less than 1 ps. These lasers are particularly suited for the current applications. Compared with the typical 10 Hz-1 kHz repetition rate of standard solid state lasers, fiber-based systems can improve the production rate by one order of magnitude. With a repetition rate of 200 kHz, a pulse energy of 10 micro-Joule per pulse (average power of 2 W), and pulse duration of 500 fs, a 20 ml colloid of gold nanoparticles with an optical density (O.D.) of 1 per centimeter can be produced in 30 min. This is a much faster speed than the reported laser-ablation-based methods such as those in Ref. 6. With a typical average power of 10 W and with split beams, the production speed can be increased by a factor of 5.

Figure 5:
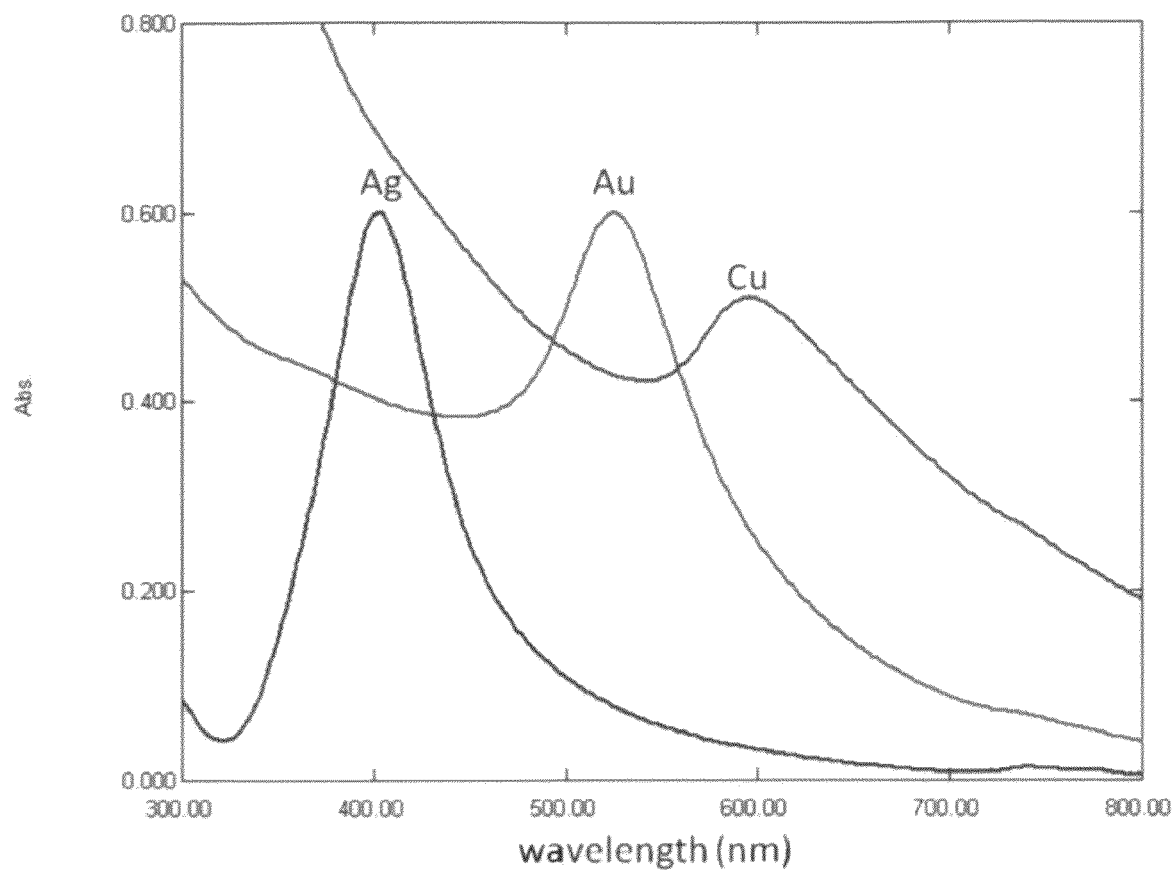
FIG. 5 is a plot of absorption versus wavelength, illustrating absorption spectra of silver, gold, and copper nanoparticle water colloids.

The methods disclosed herein may also be applied to silver and copper. FIG. 5 shows the absorption spectra of nanoparticles of all three elements of the IB group, all presenting a distinguished plasmon resonance peak.

Figure 6:
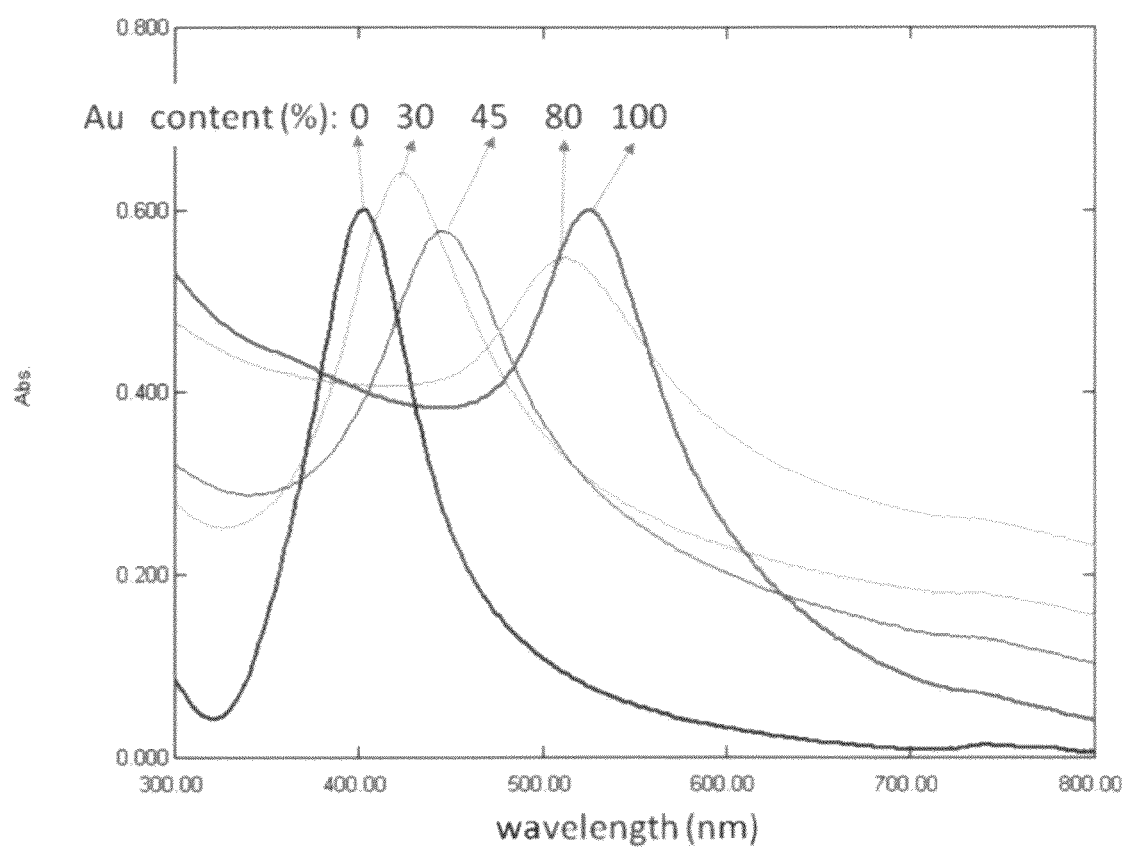
FIG. 6 is a plot of absorption versus wavelength, illustrating absorption spectra of AuAg alloy nanoparticle water colloids with five Au contents of 0 (i.e., pure Ag), 30, 45, 80, and 100 (i.e., pure Au) percent.
Figure 7:
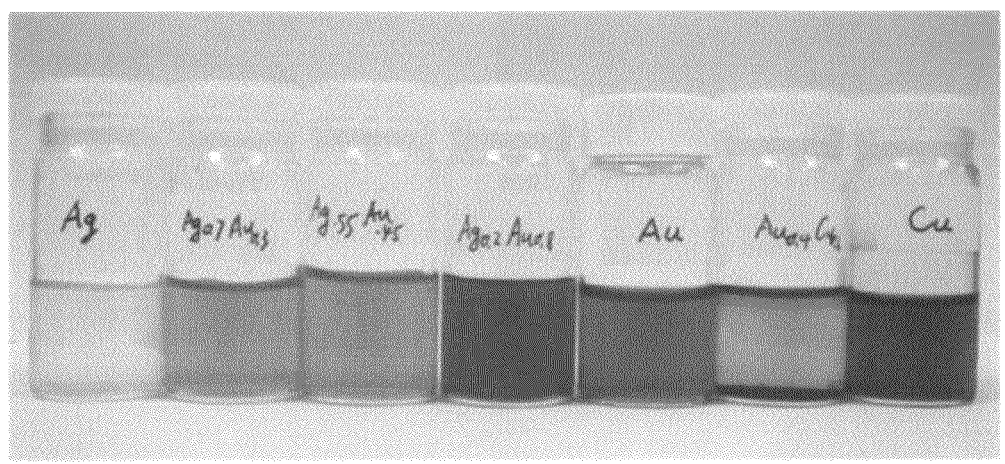
FIG. 7 is an image of a series of alloy nanoparticle water colloids. Various colors result from different plasmon resonance wavelengths.

Another aspect of the various embodiments is to provide metal alloy nanoparticles colloids with various plasmon resonance wavelengths. In earlier works of ultrashort pulsed laser ablation of NiFe alloys in vacuum [Ref. 8], it was discovered that with a low fluence near the ablation threshold, the product nanoparticles have the same alloy composition as the original alloy target. This is also understood as a disintegration of solid bulk into nanoparticles near its critical point, during which alloy phase separation is inhibited. Applying this finding to ablation in water, colloids of alloy nanoparticles of the group IB metals are obtained with various alloy compositions and accordingly various plasmon resonance wavelengths. FIG. 6 shows absorption spectra of a series of AuAg alloy colloids with five Au composition varying from 0 (i.e. pure Ag) to 100 (i.e., pure Au) percent. The shift of the plasmon resonance wavelength with the alloy composition is apparent. FIG. 7 is an image of several such group IB alloy nanoparticle colloids, including AuAg and AuCu. Various colors result from the different plasmon resonance wavelength.

The colloidal nanoparticles can be collected as nanoparticle powders, can be condensed to nanoparticle pastes or nanoparticle inks, can be dispersed to solid supporters, and can also be assembled to thin films or 3D structures. The applications of these collections or modifications of colloidal nanoparticles include, but not limited to, conductive pastes, inks, catalysts, photonic crystals, chemical and biological sensors, medical and life science products, and environmental products such as anti-bacterial agents, deodorizing agents, and water purifying agents.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

Patent Documents and Non-Patent Literature

1. J. Turkevich, P. C. Stevenson, J. Hillier, "A study of the nucleation and growth processes in the synthesis of colloidal gold", Discussions of the Faraday Society, Issue 11, 55, 1951.
2. M. Brust, M. Walker, D. Bethell, D. J. Schiffrin, R. Whyman, "Synthesis of thiol-derivatized gold nanoparticles in a 2-phase liquid-liquid system", Journal of the Chemical Society—Chemical Communications, Issue 7, 801, 1994.
3. D. Yang, S. Lee, B. Chen, S. Nikumb, "Fabrication of gold nanoparticles by pulsed laser ablation in aqueous media", Journal of Laser Micro/Nanoengineering, Vol. 3, 147, 2008.
4. S. Barcikowski, A. Hahn, A. V. Kabashin, B. N. Chichkov, "Properties of nanoparticles generated during femtosecond laser machining in air and water", Applied Physics A, Vol. 87, 47, 2007.
5. S. Besner, A. V. Kabashin, M. Meunier, "Two-step femtosecond laser ablation-based method for the synthesis of stable and ultra-pure gold nanoparticles in water", Applied Physics A, Vol. 88, 269, 2007.
6. F. Mafun, J. Kohno, Y. Takeda, T. Kondow, H. Sawabe, "Formation of gold nanoparticles by laser ablation in aqueous solution of surfactant".
7. B. Liu, Z. D. Hu, Y. Che, Y. B. Chen, X. Q. Pan, "Nanoparticle generation in ultrafast pulsed laser ablation of nickel", Applied Physics Letters, Vol. 90, 044103 (2007).
8. B. Liu, Z. D. Hu, Y. Che, "Ultrafast sources: ultrafast lasers produce nanoparticles", Laser Focus World, Vol. 43, 74 (2007).
9. T. E. Itina, M. E. Povarnitsyn, K. Gouriet, S. Noel, J. Hermann, "Mechanisms of nanoparticle formation by short laser pulses", Proceedings of SPIE, Vol. 6458, 64581U-1, (2007).

What is claimed is:

1. A method of producing nanoparticle colloids, comprising:
   generating ultrashort pulsed laser beams at a pulse repetition rate greater than 100 kHz, each pulsed laser beam having a pulse with pulse energy less than about 10 µJoules, and a pulse duration up to about 10 picoseconds (ps);
   irradiating a target with said pulsed laser beams, said target being disposed in liquid that is substantially transparent at a wavelength of said pulsed laser beams, said target being a source material for production of metal or metal-alloy nanoparticles that result from target material modification, wherein said liquid is substantially free of any stabilizing chemical agents; and
   imparting relative motion between said pulsed laser beams and said target with at least movement of the pulsed laser beams to limit heat accumulation and to substantially avoid blocking of laser pulses by scattering and absorption from nanoparticle colloids that are formed in said liquid at said repetition rate,
   wherein at said repetition rate above 100 KHz a size distribution dominated by nanoparticles results from fragmentation of particles in the laser plume, and highly stable nanoparticle colloids are produced with said steps of generating, irradiating, and imparting, notwithstanding said liquid being substantially free of any stabilizing chemical agents.

2. The method of claim 1, wherein said target comprises gold, silver, or copper.

3. The method of claim 1, wherein said target comprises a binary alloy.

4. The method of claim 1, wherein said target comprises a precious metal.

5. The method of claim 4, wherein said precious metal comprises one or more of platinum, palladium, an alloy containing platinum or palladium, or a combination thereof.

6. The method of claim 1, wherein said liquid comprises de-ionized water.

7. The method of claim 6, wherein said de-ionized water has a resistance greater than 0.05 M Ohm.cm.

8. The method of claim 1, further producing liquid flow relative to a surface of said target, and wherein said liquid flow comprises liquid movement across the target surface.

9. The method of claim 8, wherein liquid flow speed is greater than 10 ml/s.

10. The method of claim 8, wherein liquid flow is produced by a vibration stage.

11. The method of claim 10, wherein said producing comprises:
   operating said vibration stage at a frequency greater than about 1 Hz, and providing an amplitude greater than about 1 mm.

12. The method of claim 1, wherein imparting said relative motion of said pulsed laser beams comprises guiding said beams with a vibration mirror.

13. The method of claim 12, wherein said guiding comprises operating said vibration mirror at a frequency greater than about 10 Hz, and providing an angular amplitude greater than about 0.1 mrad.

14. The method of claim 13, wherein the vibration mirror guides laser beam movement on the target such that a focal spot moves with speed greater than about 0.1 m/s.

15. The method of claim 1, wherein said pulse laser beams propagate within said liquid, and said irradiating comprises focusing said pulsed beams on a surface of said target.

16. The method of claim 1, wherein said imparting said relative motion comprises rastering said pulsed beams relative to said target.

17. The method of claim 16, wherein said rastering is carried out with a vibration mirror, piezoelectric driven mirror, galvanometer mirror, or a combination thereof.

18. The method of claim 1, wherein said liquid flow causes cooling a region about said target and transporting of said nanoparticles away from a target region and toward a collection location.

19. The method of claim 1, wherein said colloid is stable for at least one week.

20. The method of claim 1, wherein said colloid is stable for at least about 2 months.

21. The method of claim 1, wherein a pulse duration of a pulsed beam is in the range of about 0.1-10 ps.

22. The method of claim 1, wherein a pulse energy is in the range of about 1-10 micro-Joule.

23. The method of claim 1, wherein the duration of each pulse is less than 1 ps.

* * * * *